July 16, 1968   J. E. VALSTAR   3,393,301
TESTING APPARATUS

Filed Jan. 27, 1964   4 Sheets-Sheet 1

$$\frac{e_o}{e_i}(S) = G(S) = \frac{1}{(R_1 C_1 S+1)(R_2 C_2 S+1)} = \frac{1}{R_1 R_2 C_1 C_2 S^2 + (R_1 C_1 + R_2 C_2) S + 1}$$

$$e_i(t) = e_o(t) + \frac{de_o}{dt}(R_1 C_1 + R_2 C_2) + \frac{de_o}{dt^2}(R_1 R_2 C_1 C_2)$$

INVENTOR.
JACOB E. VALSTAR
BY *Rolf M. Pitts*
ATTORNEY 3,393,301
TESTING APPARATUS
Jacob E. Valstar, Orange, Calif., assignor to North American Rockwell Corporation, a corporation of Delaware
Filed Jan. 27, 1964, Ser. No. 340,454
8 Claims. (Cl. 235—151.31)

ABSTRACT OF THE DISCLOSURE

Apparatus for indicating variations in the response characteristics of selected signalling apparatus, and comprising input and output sets of cascaded electrical networks responsive to the electrical analog input and output respectively of said apparatus for providing a plurality of time varying signals corresponding to successive convolution-integral analogs of transformations of a linear describing function.

Background of the Invention

In the maintenance and operation of control systems, there is frequent need to determine the dynamic and static response characteristics of a controlled device whose respons characteristics may be time-varying. The describing function thus sought for the device-under-test may then be compared with a desired describing function or other criterion to determine whether the response characteristic of the device or unit-under-test (U.U.T.) is at variance with a desired characteristic. The measure of such variance may then be used to adjust adjustable components in the control system, so as to compensate for such variation. Alternatively, such measure may be also be used to determine whether the U.U.T. has failed, or is no longer qualified to be operated as intended, and should therefore be replaced before actual damage or injury occurs to the system or its human operator.

It is further desirable to be able to conduct such measure of a controlled element's response characteristics during the "on-stream" operation or operational use of such device in its intended environment, rather than having to shut-down the control system for the specific purpose of conducting such testing. In this way, the inconvenience, expense and loss of time for shut-down and start-up are avoided. Also, where testing can be conducted during operational use of the device-to-be-tested or unit-under-test (U.U.T.), then testing can be accomplished more frequently so as to better anticipate the need for servicing or replacing such equipment.

Prior-art testing means for evaluating the response of a system during normal operation of the system have included devices which essentially provide a measure of the frequency response of the U.U.T., requiring a complexity of signal processing equipment such as narrow-band pass filters, signal dividers and integrators. Further, such methods require a large time-interval in which to process the response signals in order to provide the desired data.

One class of such prior art devices are signal injection devices employing a test input signal at a preselected dither frequency, which signal is superimposed upon the normal system input. That component response of the system output corresponding to the dither frequency test input, is then evaluated. The special disadvantages of such testing apparatus are that (1) during normal system operation, it is required to suffer an undesired output component in the system response, corresponding to the dither signal input; and (2) only limited information is obtained concerning the frequency response or transfer function of the U.U.T.

A second class of prior art devices are signal ratio devices which, while requiring no test signal injection, do require a plurality of matched pairs of an input and corresponding output narrow-bandpass filters, each pair tuned to a mutually exclusive frequency; and a signal divider for each pair to divide the output of one filter by the output of the other. The special disadvantages of such a device are the complexity of equipment required, and the time-lag or interval necessary for processing the data. A description of such devices is provided in U.S. patent application No. 275,335 filed on Apr. 24, 1963 by Robert E. Chandos, assignor to North American Aviation, Inc., assignee of the subject invention.

The concept of the subject invention allows testing of a U.U.T. during normal operation thereof, but does not require narrow-band pass filters or highly-tuned filters. Therefore, the device of the invention is not subject to filter-matching problems and filter-ringing problems of tuned filters, nor to the equipment complexity and performance time-delays inherent in integral filters. Also, the concept of the invention does not require test signal injection, and therefore avoids undesired U.U.T. outputs in response to signal injection.

Instead, the concept of the invention provides a linearized describing function or approximation to the U.U.T. response characteristics, without relying upon or requiring linearity of the U.U.T. response characteristic. The coefficients of the differential equation or real-time describing function (for the U.U.T. response characteristics) are determined by novel computing means employing passive network means such as simple R-C low-pass networks.

Accordingly, it is a broad object of the invention to provide means for measuring the response characteristics of a controlled element. It is also an object of the subject invention to provide passive means for measuring the response characteristics of a controlled element during normal operation of the controlled element.

It is another object of the subject invention to provide passive means responsive to the normal operation of a controlled element for indicating variations in the response characteristics of the controlled element.

These and other objects of the invention will become apparent from the following description, taken together with the accompanying drawings in which:

FIG. 3 and FIG. 3a are families of time histories illustrating the synthesizing of an output response at a point in time as a function of a prior history of impulse inputs;

Figure 1:
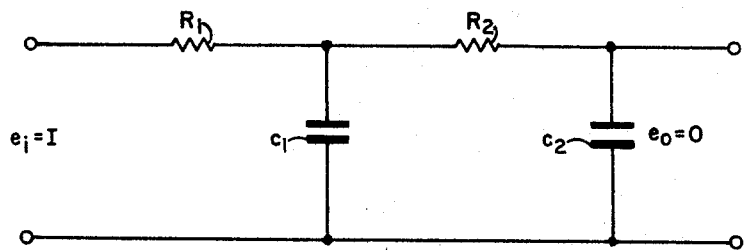
FIG. 1 is a circuit diagram of an exemplary analog of a second order lag element comprising two R-C networks in cascade.

The response characteristics of a U.U.T. may be generally described or approximated by a linear differential equation. For example, the response or output (O) of a U.U.T. comprising two cascaded low-pass R-C networks (as shown in FIG. 1) may be described in terms of the input (I) and the R-C parameters as follows. Using Laplace notation:

$$O(s) = I(s)G(s) \qquad (1)$$

where: $G(s)$ = the transfer funtcion of the cascaded R-C networks.

More particularly:

$$G(s) = \frac{1}{(T_1 s+1)} \frac{1}{(T_2 s+1)} = \frac{1}{(R_1 C_1 s+1)} \frac{1}{(R_2 C_2 s+1)} \qquad (2)$$

where:

$T_1 = R_1C_1$, time constant of the first network
$T_2 = R_2C_2$, time constant of the second network.

Substituting Equation 2 in Equation 1 and performing the indicated multiplication, $$O(s) = I(s)\frac{K}{T_1T_2S^2 + (T_1+T_2)S + 1} = \frac{KI(s)}{p_2S^2 + p_1S + 1} \quad (3)$$

where:

$K$ = D.C. gain (unity, for the example selected)
$p_2 = T_1T_2$
$p_1 = (T_1 + T_2)$ Rearranging Equation 3, $$O(s) + p_1SO(s) + p_2S^2O(s) = KI(s) \quad (4)$$

Employing the time domain notation (and assuming zero initial conditions)

$$O(t) + p_1\frac{dO(t)}{dt} + p_2\frac{d^2O(t)}{dt^2} = KI(t) \quad (5)$$

The latter equation is seen to be a linear differential equation of an order corresponding to the number of poles or denominator roots of the operator, $s$, employed in the describing function of Equation 3, and hence would require a computer mechanization embodying differentiating means in the solution for the describing parameters K, $p_1$, and $p_2$ of the describing function. Such differentiators are undesired because of the tendency to saturate in response to high frequency noise or rapid signal inputs. (Where zeroes or numerator roots of the operator, $s$, are included in a describing function, then such terms appear as operator coefficients of the input $I(s)$ in Equation 4.)

The device of the invention embodies computing means which replaces each indicated differentiation operation by a separate zero-order term. In other words, the classical linear differential equation, employed as a describing function for the element to be tested, is transformed into, or replaced by, a number of zero-order terms corresponding to the order of the equation. For example, the two-degree equation in $s$ above would be transformed, by means to be more fully disclosed hereinafter, to several zero-order terms, the several coefficients of which may then be employed in the algebraic solution of the describing function. Such solution may then be compared with a desired or nominal function to detect deviations or changes in the response performance characteristics of the unit-under-test (U.U.T.).

Such coefficients of the transformed equations are obtained in terms of the time-constants of the series of passive circuit elements such as simple R-C lag networks or low-pass filters, through which the input and output signals of the U.U.T. are severally processed.

The differential equation of Equation 5, for example, may be transformed to a new differential equation, the order of which is lowered by one due to the time functions in the terminal conditions. The order of the resulting equation can be reduced to zero (e.g., containing no derivatives of time) by successive transformations equal in number to the order of the original describing function.

Although derivatives are theoretically required for the initial conditions (of the time interval for which a solution is being made), such initial conditions can be ignored as a practical matter, as will be more fully explained hereinafter.

The transformation method provided by the input and output transformation filters, or R-C low-pass filters, is a variation of the classical Laplace transformation, and is herein referred to as a left sided, bounded Laplace transformation, for reasons which will become more apparent.

The familiar Laplace transform, as defined for example at page 12 in "Transients in Linear Systems, Vol. I" by Gardner and Barnes (published by Wiley and Sons, 1942), employs the exponential kernel, $e^{-st}$, and is defined as:

$$F(s) = \int_0^{+\infty} f(t)e^{-st}dt \quad (6)$$

where:

$t$ = time
$f(t)$ = a function of time
$s$ = the Laplace operator
$F(s)$ = a function of the operator, $s$, or the Laplace transform corresponding to the function of time $f(t)$.

Where the operation indicated by Equation 6 is performed for a limited or finite time interval ($\Delta t = t_2 - t_1$), rather than for the infinite time interval indicated, the result may be said to be bounded or truncated. Hence, the function, $$F(s, t_1 < t < t_2) = \int_{t_1}^{t_2} f(t)e^{-st}dt \quad (7)$$

is referred to as a truncated exponential integral or bounded Laplace transform. Such bounded transform has an interesting property or characteristic in that one may operate on the function over the finite region ($t_1 < t < t_2$) without knowledge of the function outside this region, provided that the initial conditions at $t_1$ and the terminal conditions at $t_2$ are known. Such property is demonstrated for the first derivative of $f(t)$ as follows:

$$sF(s) = \int_{t_1}^{t_2} \frac{df(t)}{dt}e^{-st}dt = \int_{t_1}^{t_2} e^{-st}df(t) \quad (8)$$

which is recognizable as equivalent to the form:

$$sF(s) = \int AdB = AB - \int BdA \quad (9)$$

Accordingly:

$$sF(s) = e^{-st}f(t)\Big]_{t_1}^{t_2} + \int f(t)d(e^{-st}) \quad (10)$$

$$sF(s) = e^{-st}f(t)\Big]_{t_1}^{t_2} + \int sf(t)e^{-st}dt \quad (11)$$

Rearranging the right members of the preceding equation:

$$sF(s) = s\int_{t_1}^{t_2} f(t)e^{-st}dt + e^{-st}f(t)\Big]_{t_1}^{t_2} \quad (12)$$

Substituting Equation 7 into Equation 12:

$$sF(s) = sF(s, t_1 < t < t_2) + f(t_2)e^{-st_2} - f(t_1)e^{-st_1} \quad (13)$$

where:

$f(t_1)e^{-st_1}$ = effect of initial conditions, $f(t_1)$, and
$f(t)e^{-st_2}$ = effect of terminal conditions, $f(t)$.

Equivalent general expressions can be derived for operations other than differentiation with respect to time. However, the expressions for differentiation with respect to time are all that are required for a demonstration and understanding of the concept of the invention.

It is to be appreciated that at terminal time, $t_2$, the effect of the initial conditions existing at prior time $t_1$ are attenuated or "fading away" due to the attenuating factor, $e^{-st_1}$. In other words, for a terminal condition corresponding to a reference time for which the corresponding function $sF(s)$ to be determined, the effect of the terminal condition is unattenuated by the factor $$(e^{-s(t_2-t_2)} = e^0 = 1)$$

and the effect of the initial conditions at such terminal time is attenuated as a function of the interval between such initial time and terminal (or reference) time.

Where $t_2$ is employed as the reference time the bounded Laplace transform may be said to be "left sided," as distinguished from usual practice as with the familiar (right-handed) Laplace transform—where $t_1$ is the reference time.

Where the terminal time, $t_2$, is to be employed as the reference time or time-zero, the initial time $t_1$ is measured backward from $t_2$, and the exponential kernel, $e^{-st}$, is replaced with $e^{-s(t_1-t_2)}$. As the interval between the initial or starting time ($t_1$) and the terminal or reference time ($t_2$) approaches infinity, the effects of such initial conditions may be ignored. Accordingly, Equation 13 may be rewritten, employing terminal time, $t_2$, as a reference time:

$$sF(s) = sF(s, t_1 < t < t_2) + f(t_2) - f(t_1)e^{-s(t_1-t_2)} \quad (13a)$$

$$sF(s) = sF(s, t_1 < t < t_2) + f(t_2) \quad (13b)$$

where:

$$(t_1 - t_2 \to \infty)$$

and $s$ has a real negative part

For the second derivative of $f(t)$, the truncated exponential integral or bounded left hand Laplace transform may be similarly shown to be:

$$s^2F(s) = s^2F(s, t_1 < t < t_2) +$$
$$\left[sf(t_2) + \frac{df(t_2)}{dt}\right]e^{-st_2} - \left[sf(t_1) + \frac{df(t_1)}{dt}\right]e^{-st_1} \quad (14)$$

where:

$\left[sf(t_2) + \frac{df(t_2)}{dt}\right]e^{-st_2}$ = effect of terminal conditions and $\left[sf(t_1) + \frac{df(t_1)}{dt}\right]e^{-st_1}$ = effect of initial conditions In general, for a derivative of order, $n$:

$$s^nF(s) = s^nF(s, t_1 < t < t_2) +$$
$$\left[\sum_{i=0}^{i=n-1} s^{(n-1-i)}\left(\frac{d^if(t_2)}{dt^i}\right)\right]e^{-st_2} - \left[\sum_{i=0}^{i=n-1} s^{(n-1-i)}\frac{d^if(t_1)}{dt^i}\right]e^{-st_1} \quad (15)$$

The practical basis of a device embodying the concept of the invention is the discovery that a simple R-C lowpass filter provides a left sided Laplace transform for negative real values of $s$ corresponding to the time constant of R-C network. Such relationship can be demonstrated from the relationship between the input and output of such R-C filters.

Recalling that the transfer function of a first order lowpass R-C filter is:

$$F(s) = \frac{e_o}{e_i}(s) = \frac{1}{RCs + 1} \quad (16)$$

the relationship between the input and the output in the time domain, or in real time, may be described by the inverse Laplace transform:

$$\mathcal{L}^{-1}[F(s)] = \mathcal{L}^{-1}\frac{1}{(RCs+1)} = \frac{1}{RC}e^{-t/RC} = W(t) \quad (17)$$

Figure 2:
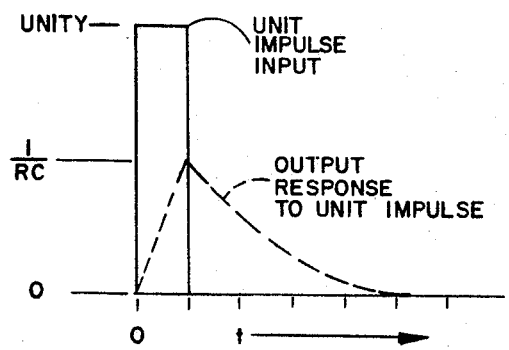
FIG. 2 is a time history illustrating the response of an exemplary first order lag element to an impulse input.

Such inverse transform also represents the response (in the time domain, or in real time) of the filter to a unit impulse input (impulse of unit magnitude applied at zero time), and is therefore also known as the impulse-response describing-function or weighing function, ($W(t)$). It is to be seen (from FIG. 2) that the subsequent response in time to such impulse input is attenuated as the intervening time interval $\tau$ (tau) increases:

$$\frac{1}{RC}e^{-\tau/RC} = \frac{1}{RC}, \text{ for } t = 0 \quad (18)$$

$$\frac{1}{RC}e^{-\tau/RC} = 0, \text{ as } t \to \infty \quad (19)$$

In other words, the present response of the R-C filter to a prior-imposed impulse input is attenuated as $\tau$, the intervening time interval between the prior application of the impulse input, $I(t-\tau)$ and present instant of current response, is increased. Such response is written generally as the product of the actual impulse magnitude $I(t)$ and the weighting function, $W(\tau)$:

$$O(t) = I(t-\tau)\frac{e^{-\tau/RC}}{RC} \quad (20)$$

Where:

$$\frac{1}{RC}e^{-\tau/RC} = W(\tau)$$

Figure 3:
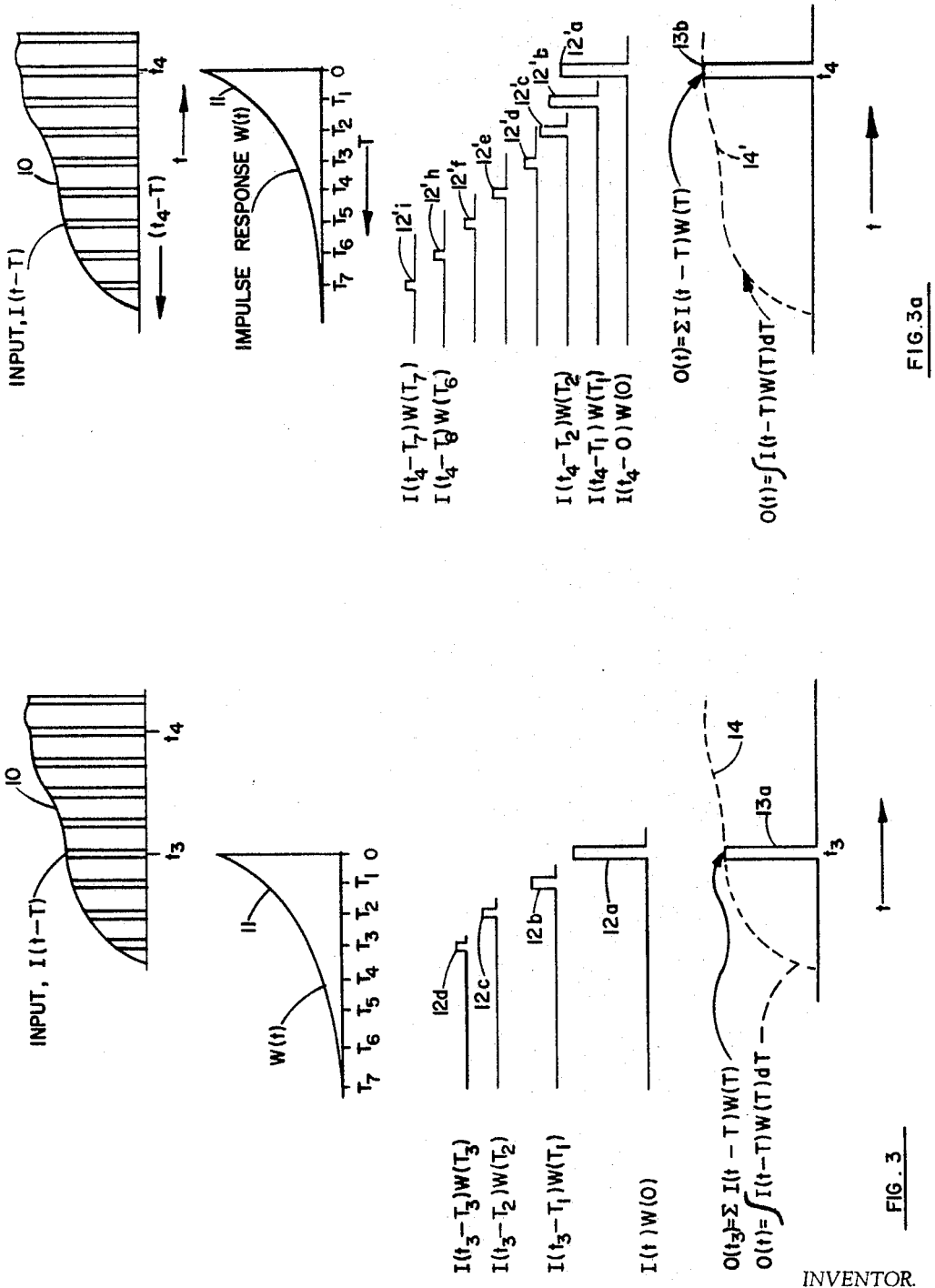

Referring to FIG. 3, there is illustrated a family of time histories, demonstrating graphically the derivation of the function $O(t)$ by the convolution integral method of Equation 20. Curve 10 is a time history of an exemplary input or forcing function applied to the first-order lag network represented by Equation 20, the input being represented as a series or sequence of impulses, $$I(t_3 - \tau_n) \ldots I(t_3 - \tau_3)$$

$I(t_3-\tau_2)$, $I(t_3-\tau_1)$, $I(t_3-O)$, each applied at an associated time $(t_3-\tau_i)$ which is antecedent (by a corresponding amount, $\tau_i$) to the reference time ($t_3$) of interest. Curve 11 is the weighing function $W(\tau)$, describing the normalized response of the network (at current time $t_3$) or the response of such network to an impulse of unit magnitude, as a function of the antecedent time interval ($\tau$) elapsing since the application of such unit impulse.

The response at time ($t_3$) to each impulse ($I(t_3-\tau_i)$) is the appropriate normalized describing function $W(\tau_i)$ for a unit impulse multiplied by the magnitude and sense of the particular impulse of interest: $I(t_3-\tau_i)W(\tau_i)$; the net response $O(t)$ being the sum of the combined responses, $$I(t_3)W(O)I(t_3-\tau_1)W(\tau_1) + I(t_3-\tau_2)W(\tau_2)$$
$$\ldots I(t_3-\tau_n)W(\tau_n)$$

Hence, $O(t_3)$ is the sum of $I(t_3-\tau)W(\tau)$, as shown by the position of curve 13a ($\tau=0$, corresponding to $t_3$).

In FIG. 3a, the response $O(t_4)$ for a time ($t_4$) subsequent to the example ($t_3$) of FIG. 3a, is indicated by the position of curve 13b ($T=0$, corresponding to $t_4$). From examination of FIGS. 3a and 3b, it is to be observed that the effect of the initial conditions of the starting time, $t_s$, upon the terminal time, or time of interest, $t$, decrease as the interval ($\tau = t - t_s$) between them increases. In other words:

$$I(t)W(t-t_s) \to O, \text{ as } (t-t_s) \to \infty \quad (21)$$

Hence, if a continuous input (as a function of time) is viewed as a finite history of time series or train of impulses of various magnitudes, then the output $O(t)$ for a particular instant ($t$) can be described as the sum of the effects of such impulse inputs:

$$O(t) = \sum_{\tau=t_s-t}^{\tau=0} I(t-\tau)\frac{e^{\tau/RC}}{RC} = \frac{1}{RC}\int_{\tau=t_s-t}^{\tau=0} I(t-\tau)e^{\tau/RC}d\tau \quad (22)$$

which latter expression is called a convolution integral in time, and is illustrated in FIG. 3. Such expression, while representing the time domain response of an R-C lowpass filter, has also been discovered to be an analog of Equation 7, differing by the gain factor, $$\frac{1}{RC}$$

outside of the integral sign in Equation 22, as may be seen from the following table:

TABLE I

| Equation (7) | Equation (22) |
|---|---|
| $F(s, t_1 < t < t_2) = \int_{t_1}^{t_2} f(t) e^{-st} dt$ | $O(t) = \frac{1}{T} \int_{\tau}^{\tau=0} I(t-\tau) e^{-\tau/T} d\tau$ |
| $e^{-st}$, exponential kernel | $e^{-\tau/T}$, impulse response. |
| $s$, Laplace operator | $-\frac{1}{T}$, reciprocal of R-C time constant. |
| $dt$ | $d\tau$. |
| Upper limit $t_2$ (corresponding to terminal time). | Lower limit, $\tau = (t-t_s)$ (corresponding to starting time). |
| Lower limit $t_1$ (corresponding to starting time). | Upper limit, $\tau = 0$ (corresponding to terminal time). |
| $I(t)$, continuous forcing function or input. | $I(t-\tau)$, delta function or impulse input. |
| Variable $t$ (of $f(t)$, running forward in time). | $(t-\tau)$, time variable running backward in time from a prescribed instant, $t$. |

It is to be kept in mind that, in response to a continuous input, the output of the simple R-C filter is a continuous function of time. In other words, the passive network or low pass filter continuously provides a running leftsided Laplace transform for the operator, $s = -1/RC$, having an output $(-sF(s,t))$; and is therefore hereafter referred to herein as a transformation filter.

Figure 4:
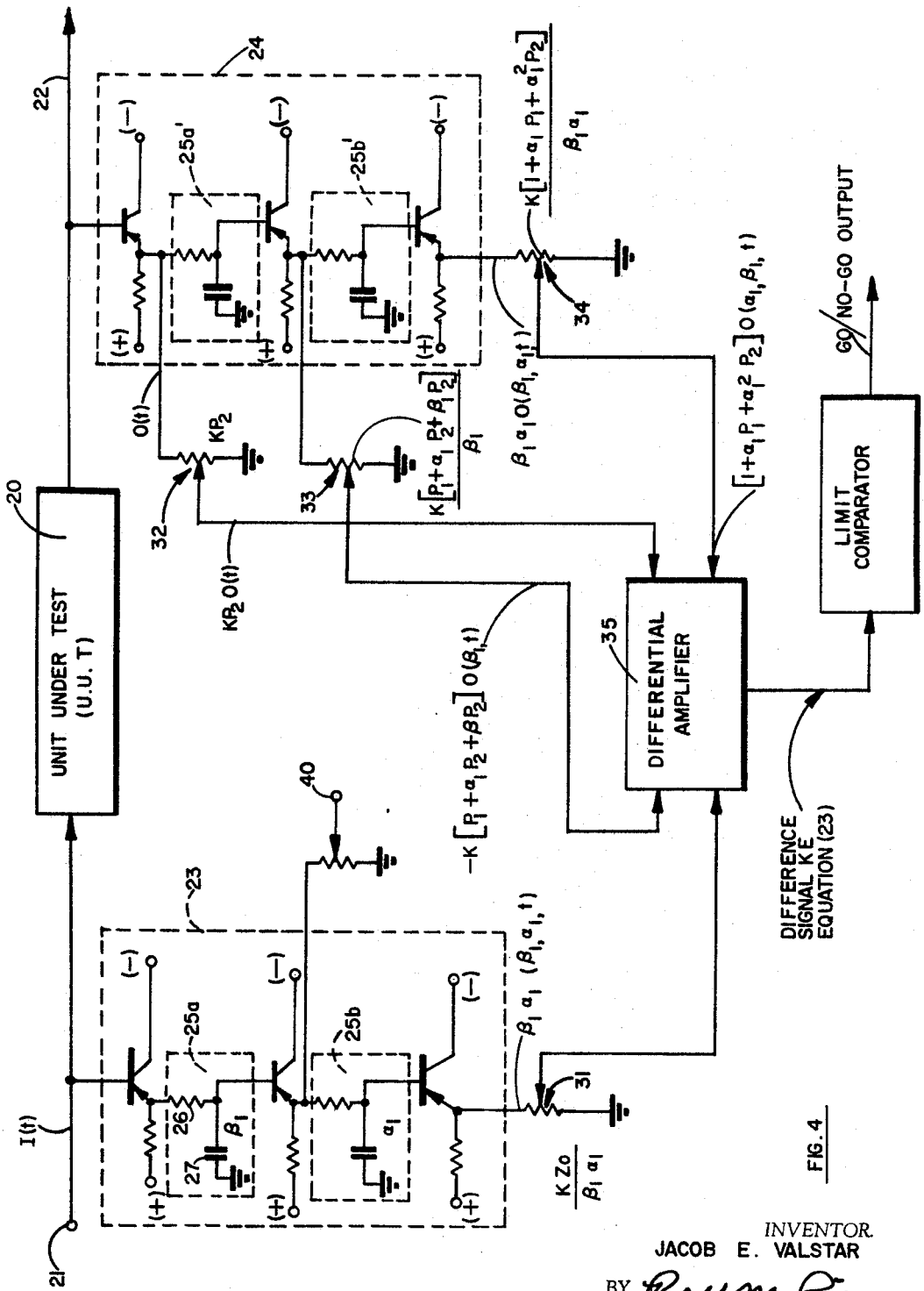
FIG. 4 is a block diagram, partly in schematic form of a system embodying a concept of the invention.

The application of the transformation filter concept to the measurement of the second order or two pole system (U.U.T.) described by Equation 5 is shown in FIG. 4.

Referring to FIG. 4, there is illustrated a system employing the concept of the invention. There is provided an element 20 susceptible of control by means of an input applied to an input terminal 21 (for providing a controlled output on output terminal 22), which controlled element 20 is to be measured or represents a unit-under-test (U.U.T.). It is assumed that the response characteristic of the system may be adequately described or approximated as a two-pole or second order system, although any form of describing function may be selected. An exemplary two-pole or second order device is the circuit of FIG. 1, for example, comprising two lag networks in cascade. Such a system is referred to as a two-pole system for the reason that the denominator of the transfer function of the device contains two roots of "$S$," or can be described as a second-order differential equation.

Adapted to cooperate with the controlled element (U.U.T.) 20 of FIG. 4 is means for indicating the response of a linear differential describing function of preselected order and approximating the response characteristics of the controlled element. There is provided a first input and second output set of transformation filters 23 and 24, each filter set comprising a like plurality of low-pass R-C filters in cascade, each filter 25 comprising an input series resistor 26 and output shunt 27 capacitor. A first filter 25a of first set 23 is adapted to be connected to the input 21 of the controlled element 20, and a first filter 25a' of second set 24 is adapted to be responsively connected to the output 22 of controlled element (U.U.T.) 20.

Although U.U.T. 20 of FIG. 4 is indicated as being a D-C electrical network, employing an electrical input or electrical driving signal to provide an electrical output or electrical response, the type of U.U.T. is not limited to D-C networks. Instead, the U.U.T. may be any type of controlled device, with transducers employed to provide D-C analogs of the input and output of U.U.T. 20 to respective filter sets 23 and 24, by means well understood in the art.

Corresponding filters 25 of the two sets of filters comprise a matched pair of filters, the filters of each pair having like R-C time-constants. In other words, filter 25a of filter sets 23 and 24 comprise a matched pair of filters; and filters 25b of filter sets 23 and 24 comprise a matched pair of filters. Interposed between the inputs and outputs of the filters are transistor amplifier stages which serve essentially as buffer stages, to provide impedance isolation. Additionally, such amplifier stages provide a certain measure of signal amplification, in order that signal levels can be adjusted entirely by adjustable attenuation means such as potentiometers, as will be more fully explained hereinafter.

There is further provided signalling means for indicating the deviation of the coefficients of the linear differential describing function from a preselected set of coefficients. A first signal adjusting means 31 is arranged to adjust the output of the first series filter set 23. Such means may be comprised of a potentiometer or the like, connected across the output of the last stage of first filter set 23.

A second signal-level adjusting means 32 is operatively connected to the input of the second filter set to provide a second adjusted-level signal.

Third signal-level adjusting means is connected to the output of each filter of the second filter set for severally providing several adjusted level-signals. Such means may be comprised of a potentiometer 33 and 34 operatively connected to the output of first and second filters 25a' and 25b', respectively, of second filter set 24.

The adjusted-level output of first filter set 23 is differentially combined with the sum of the second adjusted-level signal and the several adjusted-level outputs from second filter set 24 by means of a differential amplifier 35 or like signal combining means.

By suitably adjusting the signal-levels of the adjusted-level signals, the combined input thereof to signal combining means 35 will provide an output indicative of the deviation of the describing function (of the U.UT.) from a preselected describing function, as is to be understood from the following explanation.

The exemplary controlled element 20 of FIG. 4 may be described by means of a second order differential equation, having three coefficients: $P_1$, $p_2$ and $z_0$ (e.g., Equation 5). Accordingly, at least two transformations are required by means of the invention in order to solve for such coefficients. Such solution is provided by obtaining:

(1) The output, $O(t)$
(2) The first-transformed output, $O(\beta,t)$
(3) The second-transformed output, $O(\alpha,\beta,t)$, and
(4) The second-transformed input, $I(\alpha,\beta,t)$ where the terms $\alpha$ and $\beta$ are the respective time constants of a first and second filter of a transform filter set, and are analogs of (e.g., correspond to) the operator, $s$, of Equation 15.

In this way, the derivative terms of the time domain expression of Equation 5 are replaced by equivalent zero-order terms of $O(t)$ and $I(t)$, each multiplied by a suitable coefficient.

Signal-scaling or signal-level adjusting means such as potentiometers may be used to severally adjust the levels of the several signals of interest. The coefficient employed in scaling or adjusting the signal levels of the several signals to be combined, are preselected to represent the preselected or desired describing function. Hence, if the describing function approximating the response of the U.U.T. corresponds to the preselected describing function, the output of the signal combining means tends to approach a null. If the output is not a null, then the response characteristic of the U.U.T. (and hence the coefficient of the describing function approximating such characteristic) has varied or deviated from the preselected describing function represented by the gain settings of the potentiometers, in combination with the time constants of the transformation filters. Accordingly, the arrangement of FIG. 4 may be used as go/no go dynamic testing apparatus.

In other words, the cooperation of the potentiometers, R-C filters and signal combining means of FIG. 4 to achieve such go/no go testing is obtained by a proper selection of the gains or signal levels for the signal level adjusting means. The derivation of such scaling values or gains is best shown by application of the left sided Laplace transform method to the several terms, $$I(t), O(t), p_1 \frac{dO(t)}{dt}, \text{ and } p_2 \frac{d^2O(t)}{dt^2}$$

of Equation 5; and applying the analogy of Equation 22 (Table I) to the result.

The input $I(t)$ and output $O(t)$ for the U.U.T. element 20 of FIG. 4 are presumed related by the second order differential equation of Equation 5. This is seen to be of the form:

$$a_1(t) + b_1(t) + c_1(t) = Z_0 I(t) \quad (23)$$

Accordingly, the truncated exponential integral for the left hand member may be obtained by severally integrating the several components of the left hand member of Equation 23:

$$\int (a_1 + b_1 + c_1) e^{-st} dt = \int a_2 dt + \int b_2 dt + \int c_2 dt = Z_0 \int I(t) e^{-st} dt \quad (24)$$

Performing the indicated integration by the method of Equation 13b and substituting a constant, $\alpha$, for $s$, corresponding to the reciprocal of the time constant of the physical analog of Equation 22, as taught by Table I:

$$Z_0 \int I(t) e^{-\alpha t} dt = Z_0 I(\alpha, t) \quad (25)$$

$$\int a_2 dt = O(\alpha, t) \quad (26)$$

$$\int b_2 dt = \alpha^2 P_1 O(\alpha, t) + P_1 O(t) \quad (27)$$

$$\int c_2 dt = \alpha^2 P_2 O(\alpha, t) + \alpha P_2 O(t) + P_2 \frac{dO}{dt} \quad (28)$$

Combining the coefficients for like terms of Equations 25, 26, 27 and 28, the left sided Laplace transform of Equation 24 may be rewritten as follows:

$$[1 + \alpha P_1 + \alpha^2 P_2] O(\alpha, t) + [P_1 + \alpha P_2] O(t) +$$

$$P_2 \frac{dO(t)}{dt} = Z_0 I(\alpha, t) \quad (29)$$

This latter equation is of a similar form as Equation 23; and contains a derivative term, $dO/dt$ which can be removed by a subsequent transformation, as taught by the methods of Equations 13, 14 and 15. Performing a second left sided Laplace transformation for each of the terms of Equation 29, and substituting a constant $\beta$ for $s$, corresponding to the reciprocal of the time constant of the physical analog of Equation 22, as taught by Table I:

$$Z_0 \int I(\alpha, t) e^{-t} dt = Z_0 I(\alpha, \beta, t) \quad (30)$$

$$[1 + \alpha, P_1 + \alpha^2 P_2] \int O(\alpha, t) e^{-\beta t} dt =$$

$$[1 + \alpha P_1 + \alpha^2 P_2] O(\alpha, \beta, t) \quad (31)$$

$$[P_1 + \alpha P_2] O(t) e^{-\beta t} dt = [P_1 + \alpha P_2] O(\beta, t) \quad (32)$$

$$P_2 \int \frac{dO(t)}{dt} e^{-\beta t} dt = P_2 \beta O(\beta, t) + P_2 O(t) \quad (33)$$

Combining the coefficients of like terms for Equations 30, 31, 32 and 33, the truncated transformation of Equation 29 is as follows:

$$[1 + \alpha P_1 + \alpha^2 P_2] O(\alpha,\beta,t) + [P_1 + \alpha P_2 + \beta P_2] O(\beta,t) + P_2 O(t) = Z_0 I(\alpha,\beta,t) \quad (34)$$

Examination of Equation 34 indicates that a doubly transformed system input signal $I(\alpha,\beta,t)$ may be equated with the sum of the system signal $O(t)$, a singly transformed output signal $O(\beta,t)$, and a doubly-transformed output signal $O(\alpha,\beta,t)$ by employing suitable coefficients, $Z_0$, $P_2$, $[P_1 + \alpha P_2 + \beta_2]$, and $[1 + \alpha P_1 + \alpha^2 P_2]$, respectively.

Hence, the method of truncated transformation has been applied to the real-time input and output signals of element 20 in FIG. 4, and the reciprocals of time constants of the transformation filters have been employed as time-domain analogs of the Laplace operator, $s$. The analog of the leftsided Laplace transform operation may be computed by providing proper relative gains or attenuations of the transformed signals (relative to the output signal, $O(t)$), corresponding to the coefficients of Equation 34.

For example, the output of filter set 23 in FIG. 4 (corresponding to the variable $I(\alpha,\beta,t)$ of Equation 34) is attenuated by means of adjustable potentiometer 31 to provide a signal indicative of the product term, $Z_0 I(\alpha,\beta,t)$ of Equation 34. In other words, the attenuation of potentiometer 31 is adjusted to compensate for the attenuation term $$\left(\frac{1}{T_1 T_2}\right)$$

of the combined filter transformations and for the gain provided by the isolating amplifier stages between the filters, and to achieve an attenuation adjustment corresponding to the coefficient $Z_0$ in the term $Z_0 I(\alpha,\beta,t)$, as is well understood in the analog computer art.

Similarly, the input to filter set 24 corresponding to the untransformed term $O(t)$ is attenuated by means of potentiometer 32 to provide a signal indicative of the product term, $P_2 O(t)$ of Equation 34. In other words, the setting or adjustment of potentiometer 32 corresponds to coefficient $P_2$ of the term $P_2 O(t)$. Accordingly, it is to be appreciated that the setting of potentiometer 33 is selected to compensate for the time-constant gain term $$\left(\frac{1}{T_2} = \beta\right)$$

of the first filter of second filter set 24 and the gain of the isolating amplifier stage to provide a gain relative to that of the output $O(t)$ of element 20 (of FIG. 4), corresponding to the coefficient $[P_1 + \alpha P_2 + \beta P_2]$. Also, it is understood that the setting of potentiometer 34 is selected to compensate for the combined time-constant gain terms $$\left(\frac{1}{T_1 T_2} = \alpha \beta\right)$$

of the cascaded transformation filters of second filter set 24, and to provide a gain relative to that of $O(t)$ corresponding to the coefficient $[1 + \alpha P_1 + \alpha^2 P_2]$ of Equation 29.

It is to be further noted, in the embodiment of FIG. 4 that the time constant, $1/\beta$, of the first filter of filter set 24 corresponds to that of the second transformation of the method described by Equation 34, with potentiometer 33 providing the associated coefficient for the variable $O(\beta,t)$ of the second transformation. Further, the time-constant $1/\alpha$ of the second filter corresponds to that of the transformation described by Equation 29 (with potentiometer 34 providing the associated coefficient of the variable $O(\alpha,\beta,t)$ of the first transformation described by the method of Equation 34).

By means of the above described potentiometer settings, the embodiment of FIG. 4, provides go/no go means for determining the variation or deviation of the dynamic response characteristics of a controlled element from a preselected set of response characteristics. Further, the device of FIG. 4 comprises simple and highly effective means for evaluating such response characteristics during normal "on-stream" operation of the controlled element under test.

Although the concept of the invention illustrated in FIG. 4 has been described in terms of go/no-go test equipment applications, the invention is equally applicable to the quantitative solution of the coefficients of the actual describing function of preselecting order. In other words, the number of tests of transformation filters in FIG. 4 may be tripled in order to generate three equations in three unknowns. Then, the analog data may be digitized by means well known in the art, and the digitized data employed in a general purpose computer to obtain quantitative solutions of the coefficient $z_0$, $p_1$, and $p_2$.

The equations in matrix form for such solution would appear as follows:

$$\begin{bmatrix} [O(a_1,b_1,t)A_1+O(b_1,t)][O(b_1,a_1,t)a_1^2+O(b_1,t)a_1+O(b_1,t)b_1+O(1)][I(b_1,a_1,t)] \\ [O(a_2,b_2,t)A_2+O(b_2,t)][O(b_2,a_2,t)a_2^2+O(b_2,t)a_2+O(b_2,t)b_2+O(t)][I(b_2,a_2,t)] \\ [O(a_3,b_3,t)A_3+O(b_3,t)][O(b_3,a_3,t)a_3^2+O(b_3,t)a_3+O(b_3,t)b_3+O(t)][I(b_3,a_3,t)] \end{bmatrix} \cdot \begin{bmatrix} P_1 \\ P_2 \\ Z_0 \end{bmatrix} = \begin{bmatrix} -O(b_1,a_1,t) \\ -O(b_2,a_2,t) \\ -O(b_3,a_3,t) \end{bmatrix}$$

(35)

Figure 5:
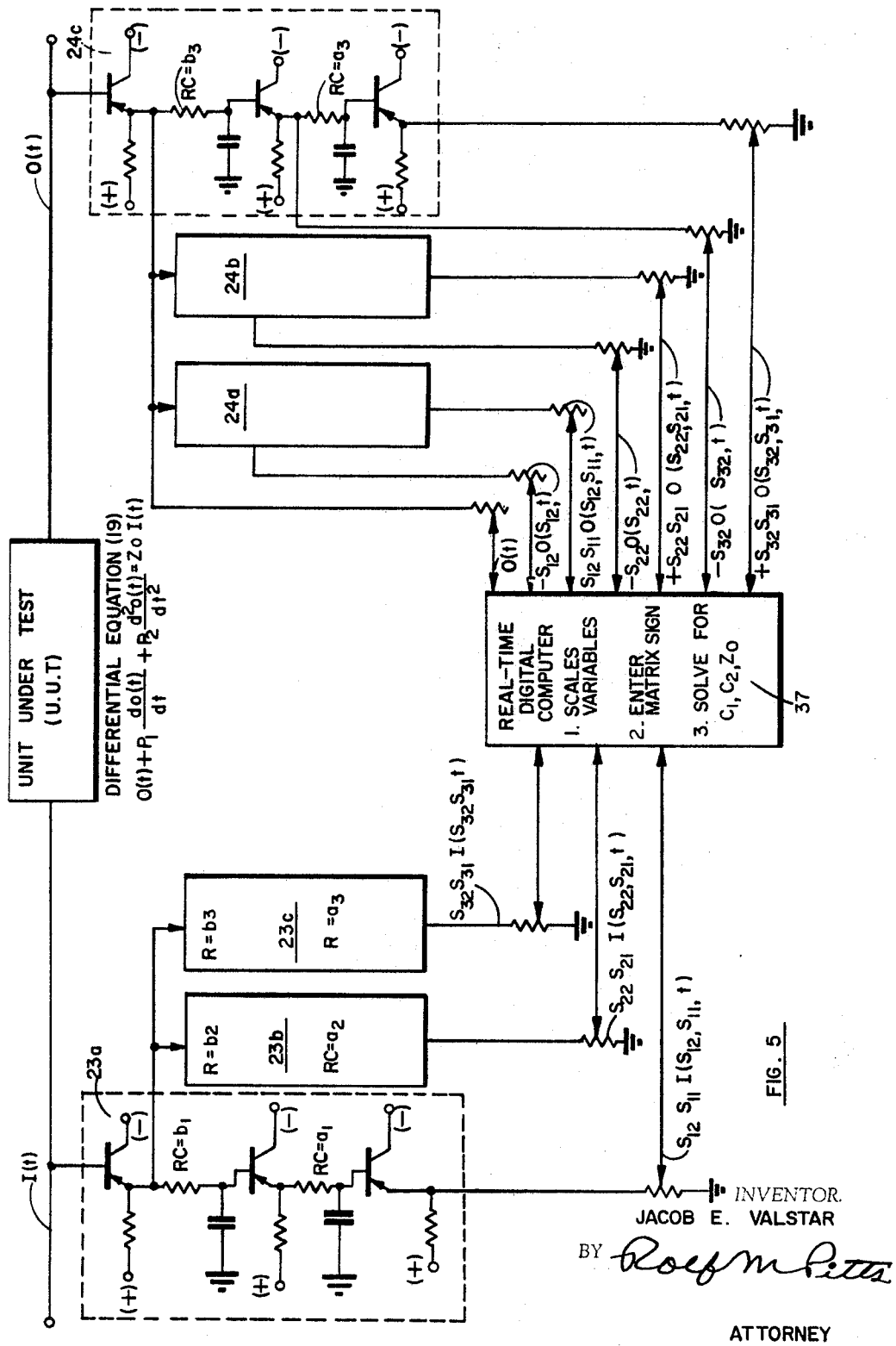
FIG. 5 is a block diagram of a system embodying a further concept of the invention.

Means for generating and solving the matrix of Equation 35 is shown in FIG. 5.

Referring to FIG. 5, there is shown means for quantitatively determining the coefficients of the second order describing function of Equation 5 and illustrating an alternate aspect of the invention. There are provided three input transformation filter sets 23a, 23b, 23c, and three corresponding output sets of transformation filters 24a, 24b, 24c, each set comprising a like plurality of R-C low pass filters in cascade, the number of filters corresponding to the order of the second order describing function to be measured. Corresponding input and output filter sets comprise matched pairs of filter sets. For example, first input filter set 23a and first output filter set 24a comprise a matched pair of filter sets.

Corresponding filters of matched pairs of filter sets comprise a matched pair of filters, the filters of each pair of filters having like response characteristics. In other words, first filter 25a of first input filter set 23a and the first filter 25a of first output filter set 24a have like R-C time constants.

The number of filter pairs in each matched pair of filter sets corresponds to the order of the describing function of preselected order to be quantitatively evaluated, and the number of matched pairs of output and input filter sets corresponding to one more than such preselected second order.

Potentiometers for suitably scaling or attenuating such outputs from each filter are included, similarly as the embodiment of FIG. 4. The digitizing of the data and the operation upon the digitized data to effect the solution for the desired coefficients is accomplished by digital means well known to those skilled in the computer art. Accordingly, digital means 37 is shown in block form only.

Although the U.U.T. 20 of FIGS. 4 and 5 has been described by Equations 2, 5 and 29 as containing only two poles (e.g., roots of the characteristic equation of the denominator of the transfer function), the concept of the invention is not so limited, and is as easily applicable to the evaluation of dynamics described by describing functions which include zeroes or numerator coefficients as well as poles or denominator coefficients as a ratio of polynominals.

For example, where the two cascaded first order lag circuits of FIG. 1 include a lead circuit, such as element or capacitor $C_3$ in parallel with, say $R_1$ of series resistors $R_1$ and $R_2$, then the transfer function thereof becomes:

$$\frac{O}{I}(s) = \frac{(sR_1C_3+1)}{[sR_1(C_1+C_3)+1](sR_2C_2+1)} \quad (36)$$

$$\frac{O}{I}(s) = \frac{(T_3s+1)}{T_1T_2s^2+(T_1+T_2)s+1} \quad (37)$$

where:
$T_1 = R_1(C_1+C_3)$
$T_2 = R_2C_2$
$T_3 = R_1C_3$

Hence, the linear differential describing of Equation 5 is modified as follows:

$$O(t) + (T_1+T_2)\frac{dO(t)}{dt} + T_1T_2\frac{d^2O(t)}{dt^2} = oI(t) + oT_3\frac{dI(t)}{dt} \quad (38)$$

$$O(t) + P_1\frac{dO(t)}{dt} + P_2\frac{d^2Ot}{dt^2} = Z_0I(t) + Z_1\frac{dI(t)}{dt} \quad (39)$$

Where:
$P_1 = (T_1+T_2)$
$P_2 = T_1T_2$
$Z_0 = 1$
$Z_1 = T_3$

Such latter expression is seen to be similar to that of Equation 5, and differs from it mainly in the addition of a derivative of $I(t)$ and associated coefficient corresponding to the zero or numerator root of the polynomial ratio of Equation 37.

The derivative terms of Equation 39 may be eliminated by the double transformation process employed in transforming Equation 5 to the form of Equation 29. Further, it is to be appreciated that just as the two cascaded filters of the output filter set 24 of FIG. 4 provide the real time analog of such transformation of the left-hand members of Equations 5 and 38, so too the cascaded filters of the input filter set 23 of FIG. 4 provide the real time analog of the two successive transformations of the right-hand member of Equation 38. Hence, it is to be understood that just as the cooperation of potentiometer 31 with the output of the second of input filter set 23 in FIG. 4 simulates the effect of coefficient $Z_0$ of $I(t)$ in the right-hand member of Equations 5 and 39 (corresponding to potentiometer 34 which simulates the effect of the double transformation of $O(t)$, so also a suitably adjusted potentiometer 40 (as shown in FIG. 4) responsively connected to the output of the first filter of input filter set 23 simulates the effect of a first transformation of input signal $I(t)$. In other words, potentiometer 40 may be properly adjusted to analog the effect of the preselected numerator root $(-1/T_3)$ of the polynominal ratio of Equation 37. The output of potentiometer 40 may then be added to the output of potentiometer 31, to be differentially combined with the other inputs to amplifier 35 for go/no-go testing.

Alternatively, the output of potentiometer 40 may be employed to expand the matrix mechanized by the device of FIG. 5, in the quantitative determination of the coefficients of a linear describing function of preselected order.

Although the U.U.T. 20 of FIGS. 4 and 5 has been described in Equations 5 and 36 by means of second order equations, the concept of the invention is not so limited and is equally applicable to the evaluation of dynamics described by describing functions of lesser or greater order, by merely including a number of R-C networks in cascade corresponding to the order of the describing function of preselected order. The necessary adjustment of the associated potentiometers may be determined by similarly employing the methods described in connection with the double transformation device of FIG. 4.

While the device of FIGS. 4 and 5 has been explained in terms of first order R-C lag circuits for analoging the real roots of a polynomial ratio, the concept of the invention is not so limited. Instead, L-C-R networks may be employed if desired, in order to more closely approximate pairs of complex conjugate roots.

Accordingly, there has been described improved means for testing the dynamic response of a controlled element during normal operation thereof, whereby operational use of the unit being tested need not be interrupted. Further, the device of the invention employs simple, reliable passive filters, and does not require the use of complex narrow bandpass filters.

Although the invention has been illustrated and de-

I claim:

1. Means for evaluating the dynamic response characteristics of an element adapted to receive an input signal comprising
   a first cascaded electrical network connected to be responsive to said input signal and to provide a time-weighted integral signal of order related to the number of poles in the desired dynamic response of said element,
   a similar second cascaded electrical network connected to be responsive to the output of said element and to provide a time-weighted integral signal for each order up to and including a preselected order related to the number of poles in the desired dynamic response of said element,
   signal attenuating means connected to receive said time-weighted integral signals for providing said signals in relatively adjusted levels, and
   means connected to said first and said second cascaded electrical networks for combining said attenuated signals to provide output signals indicating the dynamic response of said element.

2. Means for evaluating the dynamic response characteristics of an operated element adapted to receive a signal comprising
   input and output sets of cascaded electrical networks adapted to be connected to receive the electrical analog input of said signal and corresponding output respectively of said element,
   said electrical networks providing a plurality of time varying signals corresponding to successive convolution integral analogs of left sided Laplace transformations of a linear describing function of preselected order;
   adjustable signal attenuating means responsively connected to said networks for attenuating selected ones of said time varying signals,
      said attenuating means providing relative signal levels among said attenuated signals corresponding to the transform coefficients of said left sided Laplace transform; and
   signal combining means for combining said attenuated signals to provide output signals indicative of the dynamic response characteristic of said operated element.

3. Means for indicating the response of a linear differential describing function of preselected order and approximating the response characteristics of a controlled element, comprising
   a first input and second output set of transformation filters,
      each set comprising a like plurality of networks impedances in cascade,
   a first filter of said first set adapted to be responsively connected to the input of said controlled element and a first filter of said second set adapted to be responsively connected to the output of said controlled element,
   corresponding filters of said sets of filters comprising a matched pair of filters, the filters of each pair having like response characteristics,
   the number of filter pairs corresponding to the order of the describing function of preselected order, and
   signal combining means connected to said first input and second output sets and responsive to an output of said first set and further responsive to at least two outputs of said second set.

4. The device of claim 3 in which there is further provided signalling means for indicating the deviation of the coefficients of said linear differential describing function from a preselected set of coefficients, comprising:
   first signal-level adjusting means arranged to adjust the output of said first series filter set,
   second signal-level adjusting means operatively connected to the input of said second filter set to provide a second adjusted-level signal,
   third signal-level adjusting means connected to the output of each filter of the second filter set for providing several adjusted-level signals, and
   said signal combining means comprising signal evaluation means for combining the adjusted output of said first filter set and the sum of said second adjusted signal and the several adjusted outputs from said second filter set to provide signals indicative of said describing function.

5. Means for indicating the response of a linear differential describing function of preselected order and approximating the response characteristics of a controlled element, comprising:
   a first input and second output set of transformation filters,
      each set comprising a like plurality of low-pass R-C filters in cascade, each filter comprising an input series resistor and output shunt capacitor,
   a first filter of said first set adapted to be responsively connected to the input of said controlled element and a first filter of said second set adapted to be responsively connected to the output of said controlled element,
   corresponding filters of said sets of filters comprising a matched pair of filters, the filters of each pair having like R-C time constants,
   the number of filter pairs corresponding to the order of the describing function of preselected order, and
   signal combining means connected to said first input and second output sets and responsive to an output of said first set and further responsive to at least two outputs of said second set.

6. The device of claim 5 in which there is further provided signalling means for indicating the deviation of the coefficients of said linear differential describing function from a preselected set of coefficients, comprising:
   first signal-level adjusting means arranged to adjust the output of said first series filter set,
   second signal-level adjusting means operatively connected to the input of said second filter set to provide a second adjusted-level signal,
   third signal-level adjusting means connected to the output of each filter of the second filter set for severally providing several adjusted-level signals, and
   said signal combining means for differentially combining the adjusted output of said first filter set and the sum of said second adjusted-level signal and the several adjusted-level outputs from said second filter set,
   whereby the deviation of the output of said signal-combining means from a null is indicative of the deviation of said describing function.

7. Means for indicating the response of a linear differential describing function of preselected order and approximating the response characteristics of a controlled element, comprising
   a like plurality of input sets and corresponding output sets of transformation filters, each set comprising a like plurality of network impedance in cascade;
   a first filter of each of said input sets adapted to be responsively connected to the input of said controlled element and a first filter of each of said output sets adapted to be responsively connected to the output of said controlled element;
   corresponding input and output sets comprising matched pairs of filter sets, corresponding filters of said matched pairs of filter sets comprising a matched pair of filters, the filters of each pair having like response characteristics;

the number of filter pairs in each matched pair of filter sets corresponding to the order of the describing function of preselected order, and the number of matched pairs of output and input filters sets corresponding to one more than the order of the describing function of preselected order, and signal combining means connected to said input sets and said output sets of transformation filters and responsive to an output of said input set of transformation filters and further responsive to at least two outputs of said output set of transformation filters.

8. The device of claim 7 in which there is further provided signalling means for indicating the coefficients of said linear differential describing function comprising signal-level adjusting means arranged to severally adjust the output of each of said input filter sets;

signal-level adjusting means operatively connected to the inputs of said output filter sets to provide a second source of adjusted-level signals;

signal-level adjusting means connected to the output of each filter of each of the output filter sets for providing several adjusted-level signals, and said signal combining means comprising means for combining the adjusted outputs of said input filter sets and the adjusted-level signals from said second source and the several adjusted outputs from said output filter sets to provide signals indicative of the coefficients of said describing function.

References Cited
UNITED STATES PATENTS

| | | | |
|---|---|---|---|
| 2,722,659 | 11/1955 | Dickey et al. | 324—57 |
| 3,132,313 | 5/1964 | Alford | 333—32 |
| 3,217,247 | 11/1965 | Taber | 324—57 |
| 3,281,679 | 10/1966 | Schafer | 324—57 |

MARTIN P. HARTMAN, *Primary Examiner.*

MALCOLM A. MORRISON, *Examiner.*